United States Patent [19]

Dickey et al.

[11] Patent Number: 4,805,878

[45] Date of Patent: Feb. 21, 1989

[54] ANTI-ROTATION CABLE STRINGING

[75] Inventors: Glen R. Dickey; Alton M. Bosley; Robert H. Weyrich; Charles C. Juarez, all of Houston, Tex.

[73] Assignee: Houston Industries Incorporated, Houston, Tex.

[21] Appl. No.: 860,640

[22] Filed: May 7, 1986

[51] Int. Cl.$^4$ ............................................. B05H 59/00
[52] U.S. Cl. .................................................. 254/134.3 R
[58] Field of Search ............... 254/134.3 R, 134.3 FT, 254/134.3 CL; 43/44.96

[56] References Cited

U.S. PATENT DOCUMENTS 2,663,748 12/1953 Carr et al. .................. 254/134.3 R
3,970,286 7/1976 Ross .......................... 254/134.3 R

FOREIGN PATENT DOCUMENTS 945761 4/1974 Canada ........................... 43/44.96

Primary Examiner—Frederick R. Schmidt
Assistant Examiner—Judy J. Hartman
Attorney, Agent, or Firm—Pravel, Gambrell, Hewitt, Kimball & Krieger

[57] ABSTRACT

A leader member is attached at one end to a lead end of the cable on its storage reel and at its other end to a cable pulling rope. The leader member is formed from a number of flexibly connected segments. Weights are attached to the leader member to counteract the tendency of the cable to twist or rotate as it is being strung. The segments of the leader member and the weights are shaped so that they pass readily over cable stringing blocks or pulleys. The weights are located on the leader member so that only one of them at a time can be engaged and disabled by a stringing block or pulley.

19 Claims, 2 Drawing Sheets

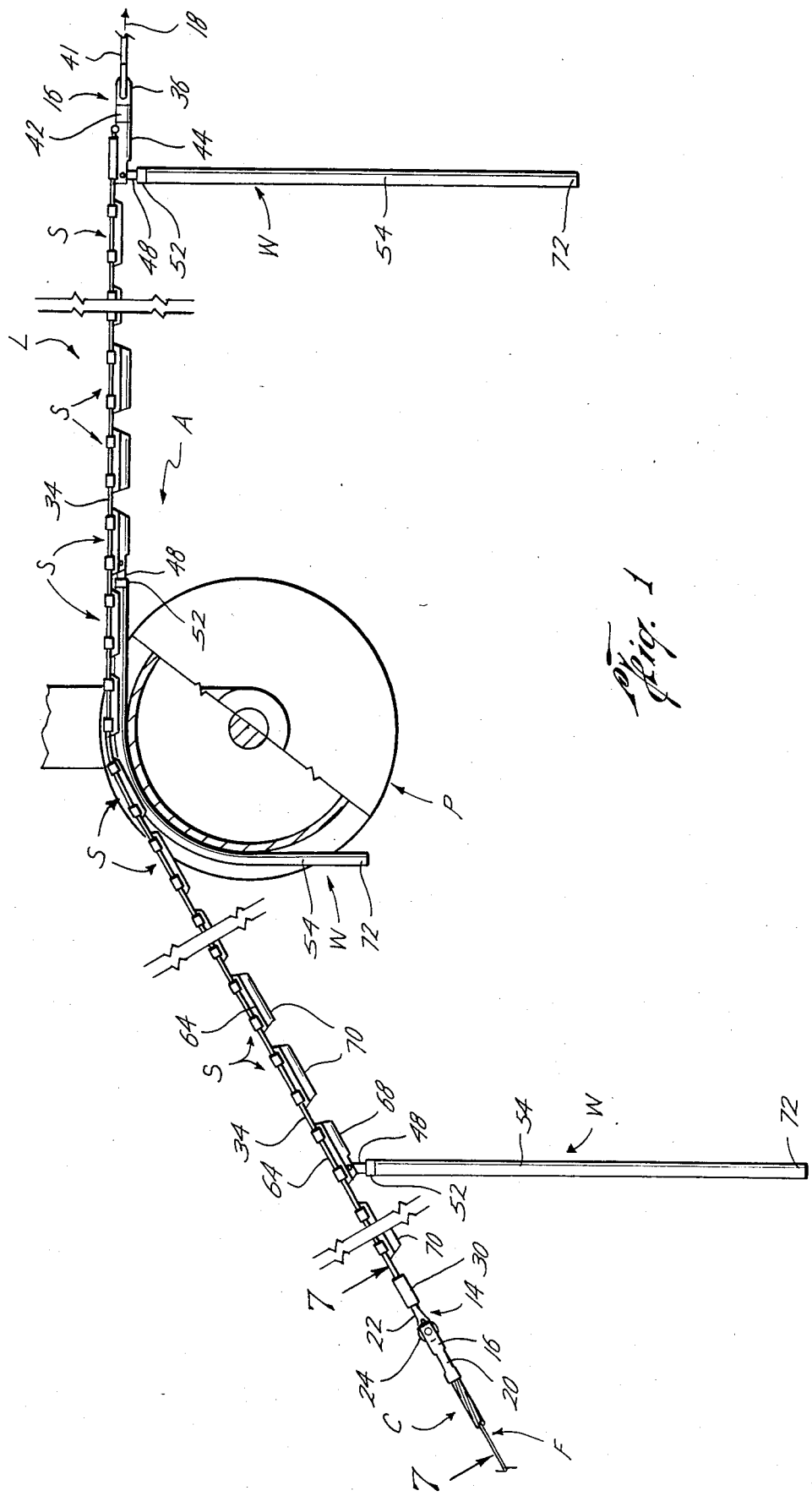

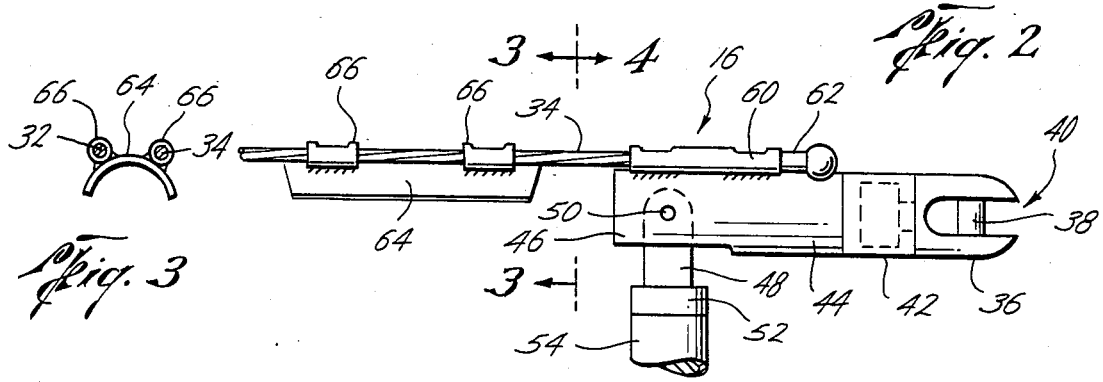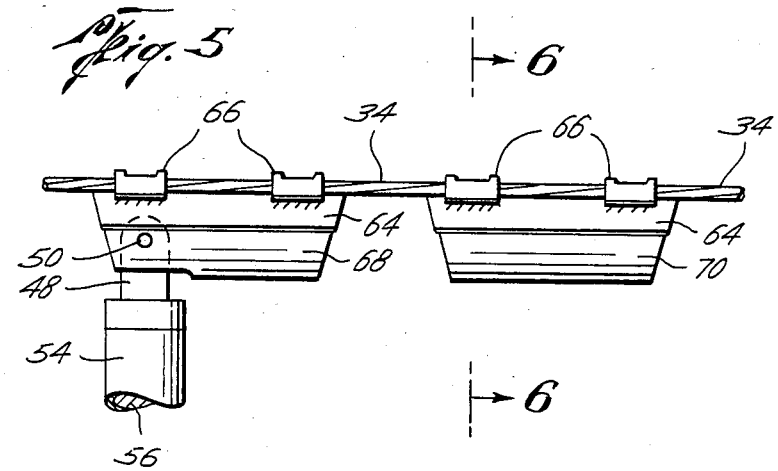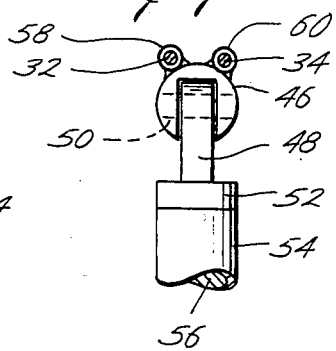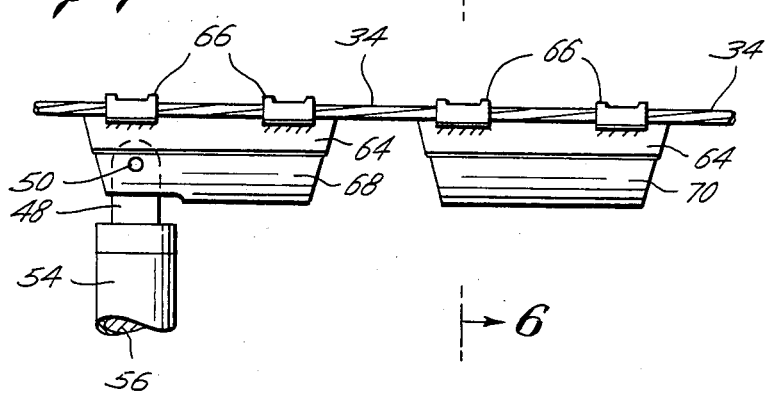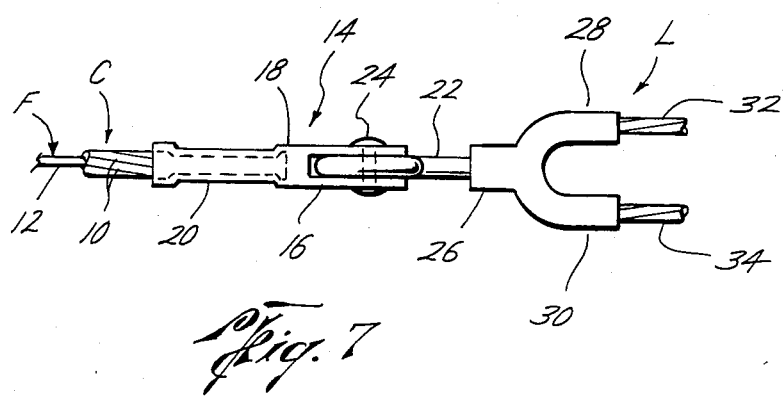

ANTI-ROTATION CABLE STRINGING

BACKGROUND OF INVENTION

1. Field of Invention

The present invention relates to stringing of wire rope or cable.

2. Description of Prior Art

Customarily, one or more inactive cables have been strung along with the active lines in electrical power transmission networks for the purpose of lightning protection. The inactive cables were formed from helically wound steel wires and were often called wire ropes.

The cables were installed by a process known as being strung. While being strung, the cables were spooled from a reel and passed over stringing blocks or pulleys on distribution towers or poles. Due to their helically wound construction, the wires in these cables had an inherent tendency to rotate or twist in response to uncoiling forces as they were being spooled from the reel during stringing.

Fiberoptic rods clad in protective metal tubes have been included in the core along the central axis of these inactive cables for telemetry and relaying purposes. The tendency of the outer wires in the cable to uncoil while being strung caused problems with the fiberoptic rods. If the outer portions of the cable twisted more than a certain amount, the fiberoptic rods would break due to the twisting forces. It was felt that there was a limit, of no more than two or so 360° rotations of the cable in one mile of cable, beyond which the integrity of the fiberoptic rod would be unreliable. Twisting problems were particularly compounded when the cable was being strung over an angular or irregular course where corners or turns were present.

SUMMARY OF INVENTION

Briefly, the present invention provides a new and improved apparatus for stringing a cable while resisting rotation of the cable as it is pulled from a storage reel and being strung. A flexible leader member formed of a number of flexibly connected segments is attached at one end of the cable and at an opposite end to a pulling rope which pulls the cable from the storage reel. A suitable number of weights are attached to hang or be suspended beneath selected ones of the flexibly connected segments along the length of the leader member. The leader member is freely rotatable at its attachment to the pulling rope and fixedly attached to the cable. The pulling rope freely twists and rotates with respect to the leader member as the cable is being strung. The force of the weights beneath the leader member counteracts or resists any tendency of the leader member, and consequently the fixedly attached cable, to rotate as the cable is being strung.

The leader member and weights are formed so that they pass along with the pulling rope and cable through stringing pulleys or other stringing structure as the cable is being strung. The weights are located on the leader member so that only one of them at a time is passing through a stringing pulley, causing anti-rotation forces to be continuously exerted on the leader member and the cable

BRIEF DESCRIPTION OF THE DRAWINGS

FIG. 1 is a side elevation view, taken partly in cross-section, of cable stringing apparatus according to the present invention;

FIG. 2 is an enlarged elevation view of a portion of the apparatus of FIG. 1;

FIG. 3 is a cross-sectional view taken along the line 3—3 of FIG. 2;

FIG. 4 is a cross-sectional view taken along the line 4—4 of FIG. 2;

FIG. 5 is an enlarged elevation view of another portion of the apparatus of FIG. 1;

FIG. 6 is a cross-sectional view taken along the line 6—6 of FIG. 5; and

FIG. 7 is a view taken along line 7—7 of FIG. 1.

DESCRIPTION OF PREFERRED EMBODIMENT

In the drawings, the letter A designates generally a new and improved apparatus for stringing a cable C while resisting rotation of the cable C as it is being pulled from a conventional storage reel and being strung. In the preferred embodiment, as shown in the drawings, the cable C is what is termed in the art a wire rope, formed from a number of helically wound steel wires 10, through the center of which passes a fiberoptic rod F clad in a protective metal tube 12. Although the present invention is particularly adapted to resist rotation of a cable C containing a fiberoptic rod F, it should be understood that the apparatus A of the present invention may be used in stringing other types of wire rope cables where cable rotation or twisting due to the helically wound construction of the wire ropes causes a problem.

In the apparatus A, a flexible leader member L formed of a number of flexibly connected segments S is attached at a rear end by an attachment mechanism 14 to the cable C at a lead end by an attachment mechanism 16 to a conventional pulling rope. As pulling forces are exerted by the pulling rope, the apparatus A and the connected cable C move in the direction of an arrow 18 and are strung in an electrical power distribution network. During the course of stringing operations, the cable C is unspooled or uncoiled from its storage reel by the pulling rope. The pulling rope, the apparatus A and the cable C pass over a number of suitably located stringing pulleys P as the cable C is being strung.

A suitable number of weight members W are attached to hang or be suspended beneath selected ones of the flexibly connected segments S along the length of the leader member L. In the preferred embodiment three are shown, although it should be understood that other numbers could be used depending on the amount of anti-rotation force needed.

The leader member L is freely rotatable at its attachment mechanism 16 to the pulling rope and is fixedly attached at its attachment 14 to the cable C. The pulling rope may thus freely twist and rotate with respect to the leader member L as the cable C is being strung. The force of the weights W suspended beneath the leader member L counteracts or resists any tendency of the leader member L, and consequently the fixedly attached cable C, to rotate as the cable C is being strung. As will be set forth below, the leader member L and weights W are formed so that they pass along with the pulling rope and the cable C through stringing pulleys P or other stringing structure as the cable is being strung. Further, the weights W are located on the leader member L so that only one of them at a time is passing through a stringing pulley P and thus not exerting anti-rotation force on the leader member L. This permits the other suspended weights W to exert downward forces on leader member L, causing anti-rotation forces to be continuously exerted on the leader member L and the cable C.

In the rear attachment mechanism 14 (FIG. 7), a clevis member 16 having a rearwardly extending, deformable sleeve 18 receives the lead end of the cable C. After the lead end of the cable C is inserted in the sleeve member 18, the sleeve member 18 is crimped or otherwise suitably deformed to rigidly attach the cable C to the clevis member 16. An eyelet member 22 is inserted into the clevis member 16 and fixedly attached thereto by bolts 24 or other suitable fixed attaching means. The eyelet member 22 is connected to a yoke member 26 which receives in arm portions 28 and 30 cable members 32 and 34, respectively, of the leader member L.

In the lead or front attachment member 16 (FIG. 2) a clevis member 36 has a connector rod 38 formed in a socket 40 to receive a connector eyelet or hook 41 (FIG. 1) attached to the pulling rope. The clevis member 36 is freely rotatable with respect to the remaining portions of the lead attachment 16 by a rotatable end of swivel member 42.

A cylindrical header plug 44 (FIGS. 2 and 4) is fixedly attached to the fixed body of swivel member 42. A mounting slot is formed in a rear portion 46 of the header plug 44 to receive a connector tab 48 of a first of the weight members W. The connector tab 48 and the weight W are pivotally connected by a connector pin 50 to normally hang or be suspended beneath the header plug 44. The connector tab 48 connects a top cap 52 of the weight W to the leader member L.

A flexible tubular member 54 of the weight W is attached beneath the cap 52. The tubular member 54 may be made from any suitable flexible synthetic resin of acceptable strength. The flexible tubular member 54 is filled with a number of weighted slugs or segments 56 and is closed at its lower end. In the preferred embodiment, the slugs or segments 56 are of about three inches in length and are formed by being cut from a suitable heavy metal bar, such as steel. It should be understood that these dimensions are given only by way of example. Other lengths are equally suitable depending on the amount of flexibility needed in the weights W. In this manner, each of the weights W are flexible along their length and exert a downward force of on the order of seven to ten pounds on the leader member L.

Tubular receiving sleeves 58 and 60 (FIGS. 2 & 4) are welded or otherwise mounted atop the header plug 44 to receive therein the cables 32 and 34 of the leader member L. The receiving sleeves 58 and 60 are fixedly attached to the cables 32 and 34 by crimping or other suitable techniques. End caps 62 (FIG. 2) are formed on the ends of the cables 32 and 34 to mount to the cables 32 and 34 to the header plug 44.

Connected in the leader member L behind the header plug 44 at spaced positions are a number of link members 64 (FIGS. 2 & 3) which are fixedly connected at connector members 66 onto the cables 32 and 34. The connector members 66 are welded or otherwise suitably attached to the link members 64. Although each of the link members 64 is fixedly attached to the cables 32 and 34, there is sufficient length of cables 32 and 34 between adjacent members 64 to allow the segments S to be flexibly connected to each other. This permits the weights W to exert continuous downward anti-rotational force on the leader member L to prevent the cable C from rotating. The link members 64 are in the form of an inverted U or C-shape, having a downwardly facing arcuate trough 64 formed therein to receive the tubular section 54 (FIG. 1) of the weight W as it passes over stringing structure, such as the pulley P. The number of link members 64 and their spacing is such that the entire tubular portion 54 of the weight W will be received therein as each of the weights W of the leader member L individually passes over the pulley P. This serves to prevent any snagging or misalignment of the leader member L and cable C in passage through stringing structure, even over an irregular course.

The weight members W in the apparatus A, other than the connection of the lead one connected to the header plug 42 rather than to a segment S, are of like construction and function to each other. The rear two of the weight members W are connected to a segment S at spaced positions along the length of the leader member L. The segments S to which the weights W are attached take the form of a link member 64 (FIGS. 5 & 6) having a tubular guide pipe 68 mounted therewith. The guide pipe 68 is preferably of a like diameter to the tubular portion 54 of the weights W. The weights W are pivotally mounted by a pin 50 to a rear slot formed in the guide pipe 68. A selected number of link members 64 in advance of the guide pipe 68 are modified to receive tubular guide pipes 70. In this manner, as the lower end 72 of the individual weights W passes from contact with the stringing pulley P and drops downwardly, the following guide pipes 70 with link members 64 serve to keep the leader member L in alignment with the pulling rope as the cable C is being strung.

At a rear portion of the leader member L, spaced between the lower end 72 of the last of the weights W and in advance of the rear attachment mechanism 14, a further number of link members 64 having tubular guide members 70 are located. The purpose of the link members 64 with tubular guide members 70 is to insure that the attachment mechanism 14 and the ensuing cable C follow with the leader member L through the pulley P.

In the operation of the present invention, the apparatus A is fixedly attached at its attachment mechanism 14 to the cable C on the storage reel. The apparatus A is also attached at its lead attachment mechanism 16 to the eyelet 41 attached to the towing rope. Stringing forces are then applied through the towing rope to the apparatus A and cable C. The towing rope and the leader member L are pulled along the distribution line where the cable C is to be strung and the cable C passed from the storage reel. As the towing rope passes over stringing structure, such as a stringing pulley P, the header plug 44 of the apparatus A comes into contact with the stringing structure. The lead one of the weights W is then forced through contact with the pulley P upwardly into the inverted troughs 66 of the segments S as the leader member L moves through the stringing structure.

After the lead weight W passes through the stringing structure, it falls back downwardly to its normal hanging position while the tubular guide pipes 70 of the segments S succeeding it pass through the pulley P, insuring continued alignment of the leader member L. The guide pipe 68 having the next of the weights W suspended therebeneath then comes into contact with the pulley P (FIG. 1) and the flexible weight W conforms to the surface of the pulley P during movement therethrough. It is to be noted that due to the spacing and location of the weights W along the leader member L, only one at a particular time is in contact with the stringing structure so that the remaining two weights continue to exert downward, anti-rotational forces on the leader member L and the cable C, while the towing rope is freely rotatable at the attachment mechanism 16.

The foregoing disclosure and description of the invention are illustrative and explanatory thereof, and various changes in the size, shape and materials, as well as in the details of the illustrated construction may be made without departing from the spirit of the invention.

We claim:

1. An apparatus for stringing a cable while resisting rotation of the cable as it is pulled from a storage reel and being strung, comprising:
    (a) a leader member formed of a plurality of flexibly connected segments;
    (b) said leader member being attachable at one end to the cable;
    (c) said leader member being attachable at an opposite end to a pulling rope for pulling the cable from the reel; and
    (d) weight means mounted with said leader member for exerting a force on said leader member resisting rotation of said leader member and the cable, said weight means comprising a plurality of flexible weight members mounted at spaced positions from each other along said leader member, each of said plurality of weight members comprising:
        (1) a number of individual weight bodies;
        (2) a flexible tubular member for containing said weight bodies; and
        (3) means for attaching said tubular member to one of said flexibly connected segments.

2. The apparatus of claim 1, wherein:
   said leader member is fixedly attached at said one end to the cable.

3. The apparatus of claim 1, wherein:
   said leader member is rotatably attached at said opposite end to the pulling rope.

4. The apparatus of claim 1, wherein said means for attaching comprises:
   means for pivotally mounting said tubular member to one of said flexibly connected segments.

5. The apparatus of claim 1, wherein said means for attaching comprises:
   means for suspending said tubular member from one of said flexibly connected segments.

6. The apparatus of claim 1, wherein the cable is strung over stringing structure over which said leader member and said weight means pass as the cable is being strung, and wherein:
   said leader member and said weight means are formed to fit within the stringing structure as they pass therethrough.

7. The apparatus of claim 6, further including:
   guide means mounted in said leader member in advance of said weight means for guiding said weight means onto the stringing pulleys.

8. The apparatus of claim 7, wherein said guide means comprises:
   at least one tubular guide member mounted in said leader member in advance of each of said plurality of weight members.

9. The apparatus of claim 7, wherein said guide means comprises:
   a plurality of tubular guide members mounted in said leader member in advance of each of said plurality of weight members.

10. The apparatus of claim 1, wherein said each of flexibly connected segments comprises:
    a link member flexibly connected in said leader member along the direction the cable is being strung.

11. The apparatus of claim 10, wherein:
    each of said link members has a downwardly facing arcuate trough formed therein.

12. The apparatus of claim 11, wherein the cable is strung over stringing pulleys over which said leader member and said weight means pass as the cable is being strung, and wherein:
    said flexible weight members are adapted to fit within said arcuate troughs in said flexibly connected link members while passing through the stringing pulleys.

13. The apparatus of claim 10, further including:
    means for flexibly connecting said link members together at spaced positions from each other in said leader member.

14. The apparatus of claim 13, wherein said means for flexibly connecting comprises:
    at least one length of cable flexible connecting adjacent ones of said link members together at spaced positions from each other.

15. The apparatus of claim 13, wherein:
    said link members are rigidly attached to said means for flexibly connecting.

16. An apparatus for stringing a cable while resisting rotation of the cable as it is pulled from a storage reel and being strung, comprising:
    (a) a leader member formed of a plurality of flexibly connected segments of link members;
    (b) said leader member being attachable at one end to the cable;
    (c) said leader member being attachable at an opposite end to a pulling rope for pulling the cable from the reel;
    (d) weight means mounted with said leader member for exerting a force on said leader member resisting rotation of said leader member and the cable; and
    (e) cable means rigidly attached to each of said link members, said cable means being of sufficient length between said link members for flexibly connecting said link members together at spaced positions from each other in said leader member.

17. The apparatus of claim 16, wherein:
    said link members are rigidly attached to said means for flexibly connecting.

18. An anti-twist device for use in aerial installation of transmission cables along transmission line support structures having pulleys attached thereto through which a transmission cable is pulled during installation, said device comprising an elongated universally directionally flexible leader having a rotatable swivel connector at one end thereof for attachment to a pulling cable and a non-rotatable connector at the other end for connection to an end of a transmission cable to be pulled through aerially mounted pulleys attached to transmission line support structures, at least two weighted, flexible hanging tubes attached to the leader at spaced locations intermediate its said ends, of said tubes having sufficient weight to prevent rotation of the leader and attached transmission cable about their longitudinal axis during use in a cable-pulling operation, each of said tubes being of sufficient diameter and longitudinal flexibility to pass with the leader through pulleys employed on transmission line support structures, and said tubes being spaced a sufficient distance apart along said leader to ensure clearance of one tube from engagement with a supporting pulley before engagement of the other tube therewith such that the weight of at least one tube at all times serves to prevent rotation of the leader and attached transmission cable about their longitudinal axis during a cable-pulling operation.

19. An anti-twist device for installation of a transmission cable along transmission line support structures having serially mounted pulleys attached thereto through which the transmission cable is pulled during installation, comprising an elongated universally directionally flexible leader having a rotatable swivel connector at one end for attachment to a pulling cable and a non-rotatable connector at the other end for connection to an end of the transmission cable to pulled through the aerially mounted pulleys, at least two weighted, flexible hanging tubes attached to said leader at spaced locations intermediate its ends, said tubes having sufficient weight to prevent rotation of said leader and the attached transmission cable about their longitudinal axes during a cable-pulling operation, each of said tubes being of sufficient diameter and longitudinal flexibility to pass with the leader through the aerially mounted pulleys, and said tubes being spaced a sufficient distance apart along said leader to ensure clearance of one tube from engagement with a pulley before engagement of another tube therewith such that the weight of at least one tube at all times serves to prevent rotation of said leader and the attached transmission cable about their longitudinal axes during a cable-pulling operation.

* * * * *